United States Patent
Glidewell (12)

(10) Patent No.: US 6,915,516 B1
(45) Date of Patent: Jul. 5, 2005

(54) APPARATUS AND METHOD FOR PROCESS DISPATCHING BETWEEN INDIVIDUAL PROCESSORS OF A MULTI-PROCESSOR SYSTEM

(75) Inventor: Keith Glidewell, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 847 days.

(21) Appl. No.: 09/677,120

(22) Filed: Sep. 29, 2000

(51) Int. Cl.[7] ................................................ G06F 9/46
(52) U.S. Cl. ...................... 718/103; 718/100; 718/101; 718/102; 718/104; 718/105
(58) Field of Search ................................ 718/100–105; 709/100, 101, 102, 103

(56) References Cited

U.S. PATENT DOCUMENTS

| | | | | |
|---|---|---|---|---|
| 5,745,778 A | * | 4/1998 | Alfieri | 712/1 |
| 6,105,053 A | * | 8/2000 | Kimmel et al. | 718/105 |

* cited by examiner

*Primary Examiner*—Meng-Al T. An
*Assistant Examiner*—Nilesh Shah
(74) *Attorney, Agent, or Firm*—A. Jose Cortina; Daniels Daniels & Verdonik, P.A.; R. Kevin Perkins

(57) ABSTRACT

A method and system allocate resources in a plurality of processors system. When a processor is idle, the system determines when another processor is not idle. The time the non-idle processor remains non-idle is timed, and once a predetermined amount of time elapses, if the non-idle processor is still not idle, the idle processor poaches a job from the non-idle processor.

13 Claims, 7 Drawing Sheets

APPARATUS AND METHOD FOR PROCESS DISPATCHING BETWEEN INDIVIDUAL PROCESSORS OF A MULTI-PROCESSOR SYSTEM

BACKGROUND OF THE INVENTION

1. Field of the Invention

The present invention relates generally to computer operating systems and more particularly to a method for dispatching processes between individual processors of a multi-processor system.

2. Description of the Prior Art

In a multi-processing system on which symmetric multi-processing is conducted, each processor has equal access to the memory and input/output resources. The problem with such systems is that as you add processors to the BUS, the BUS becomes saturated and it becomes impossible to add more processors.

A prior art solution to that problem was to extend symmetric multi-processing with a technique known as Cache Coherent Non-Uniform Memory Access, i.e., ccNUMA. In such systems, the processors do not have to do anything extraordinary to access memory. Normal reads and writes are issued, and caching is all handled in hardware. By the term "Coherent" is meant that if processor "A" reads a memory location and processor "B" reads a memory location, both processors see the same data at that memory location. If one processor writes to that location, the other will see the data written. The fact that access is described as being non-uniform refers to the fact that memory is physically and electrically closer to one processor than to another processor. So if memory is accessed from one processor, and it is local, the access is much faster than if the memory is accessed from a remote processor.

Modern multi-processing systems can have eight or more individual processors sharing processing tasks. Many such systems incorporate caches that are shared by a subset of the system's processors. Typically the systems are implemented in blocks, where each block is a symmetric multi-processing system consisting of four processors, and current systems have implemented up to sixteen blocks for a total arrangement of up to sixty-four processors.

In such a system, each block with a reference to data to be accessed is put on a sharing chain which is a link list, maintained by the ccNUMA hardware. Each additional block that has a reference to the data will have a link on the sharing chain. When a write operation occurs, the sharing chain has to be torn down, i.e., invalidated, because only one block can be writing to a memory location at a time. If a memory location is being read, multiple blocks can read the same memory location with low latency. As additional blocks read the data, the sharing chain blocks can be built up with blocks that are reading the data and a copy of the data is cached local to each of these blocks.

In such a system, best access time occurs if a block is accessing local memory, i.e., memory that is from the same symmetric multi-processing block. The next best access time occurs if it is memory that is from another block, but is in the processor block's far memory cache. The next best scenario, is if a processor writes to a far memory location that was just written on another block. The reason that this does not cause excessive latency is because there is only one block on the sharing chain, since the write tore down the sharing chain. Thus, if the processor has to write to the memory location, it just has to invalidate one block. The worst case scenario is where a long sharing chain has to be tom down. If eight blocks have all read the memory, and a processor wishes to write to the memory, an indication has to be sent to every one of the eight blocks indicating that the copy of the memory location is invalid and can no longer be used.

One prior art system involved adding additional processors to a NUMA system. When performance was tested, it was unexpectedly uncovered that as processors were added, through-put actually declined and the number of transactions that could be processed in a minute declined. A confusing part about the decline was that an analysis of the system revealed that it was mostly idle, but that there was a significant amount of scalable coherent interconnect traffic. The "scalable coherent interconnect" is typically the NUMA backplane. Further analysis revealed that the problem resulted from processors which were not running a user process, i.e., processors which were technically idle, but as a result of the idle state were actually spinning constantly searching for tasks to process.

An example of the way tasks are arranged in such a system are described in greater detail in U.S. Pat. 5,745,778 which describes a method of operation of a multi-processor data processing system using a method of organizing and scheduling threads. Specifically, in that system, "threads," which are programming constructs that facilitate efficient control of numerous asynchronous tasks are assigned priorities in a limited portion of a range. The disclosure of the noted patent describes how thread groups and threads can be assigned priority and scheduled globally to compete for central processing unit, i.e., processor or CPU, resources available anywhere in the system.

In the above-described system in which additional processors were added, it was discovered that data structures used by the idle processor were not allocated from local memory, and as the processors were idle in their own data structures, they would actually be reading and writing memory from a far locale. The other problem uncovered was that the processors were searching for work too aggressively, and upon determining that there was no work to do on their own queue, would start to examine other lists for other processors in other locales. As such, the processor would immediately poach a process from another processor, even if that other processor or system was suddenly going to become idle. This would cause moving all of the process' data and cache footprint to the idle processor, resulting in reduced through-put.

For purposes of this disclosure, it should be noted that by the term "poaching" is meant taking a job from another processor or locale's ready list. By "locale" is meant a symmetric multi-processor system which is implemented within a NUMA system as a block and is made up of four individual processors, each with their own cache. Similarly central processing unit, CPU and processor are used interchangeably herein, and are used to refer to individual processors arranged in symmetric multi-processing blocks, i.e., SMP deployed in a NUMA system.

Accordingly, in accordance with the invention, the delays associated with such poaching in a large multi-processor system are avoided by the system and method described herein.

SUMMARY OF THE INVENTION

There is disclosed a method of operation of a multi-processor data processing system which attempts to keep all of the processors on the multi-processor Non-Uniform Memory Architecture system performing productive work.

The method involves allocating resources in a plurality of processors system, with each processor having a cache associated therewith. When at least one processor of the plurality of processors is idle, it is determined if at least one other processor of the plurality of processors is not idle. If the processor which is not idle remains not idle for a predetermined period of time, the idle processor poaches a process on the queue of the non-idle processor to be run by the processor which is idle.

In a more specific aspect, if more than one processor is idle, poaching occurs with the idle processor which is electrically closest to the non-idle processor. The further away in terms of electrical connection proximity that a non-idle processor is to an idle processor, the longer the time period that the non-idle processor is allowed to remain non-idle.

In an alternative aspect, the invention relates to a data processing system for allocating resources for simultaneously executing a plurality of processing tasks. The system includes a plurality of processors, each having a cache associated therewith. A timer is associated with each processor for timing from the beginning of running a process from the processor's queue, the duration of time the process is run. During this time the processor is considered as being non-idle, a detector determines the duration of time any one processor is not idle, and the processors are configured such that they can poach a process from a non-idle processor when the duration of time during which the non-idle processor is running exceeds a predetermined amount.

In a more specific aspect, the system is configured for allowing an idle processor connected electrically closest to a non-idle processor to have priority in poaching a process in the event there are more than one non-idle processors. The system is further configured to allow the time period during which a processor is allowed to remain non-idle, determined in accordance with the proximity in electrical connection between the non-idle processor and an idle processor, in which the greater the connection distance, the greater the predetermined amount of time allowed.

Other features of the invention will be understood by those of ordinary skill in the art after referring to the detailed description of the preferred embodiment and drawings.

DESCRIPTION OF THE PREFERRED EMBODIMENT

1. System Overview

Figure 1:
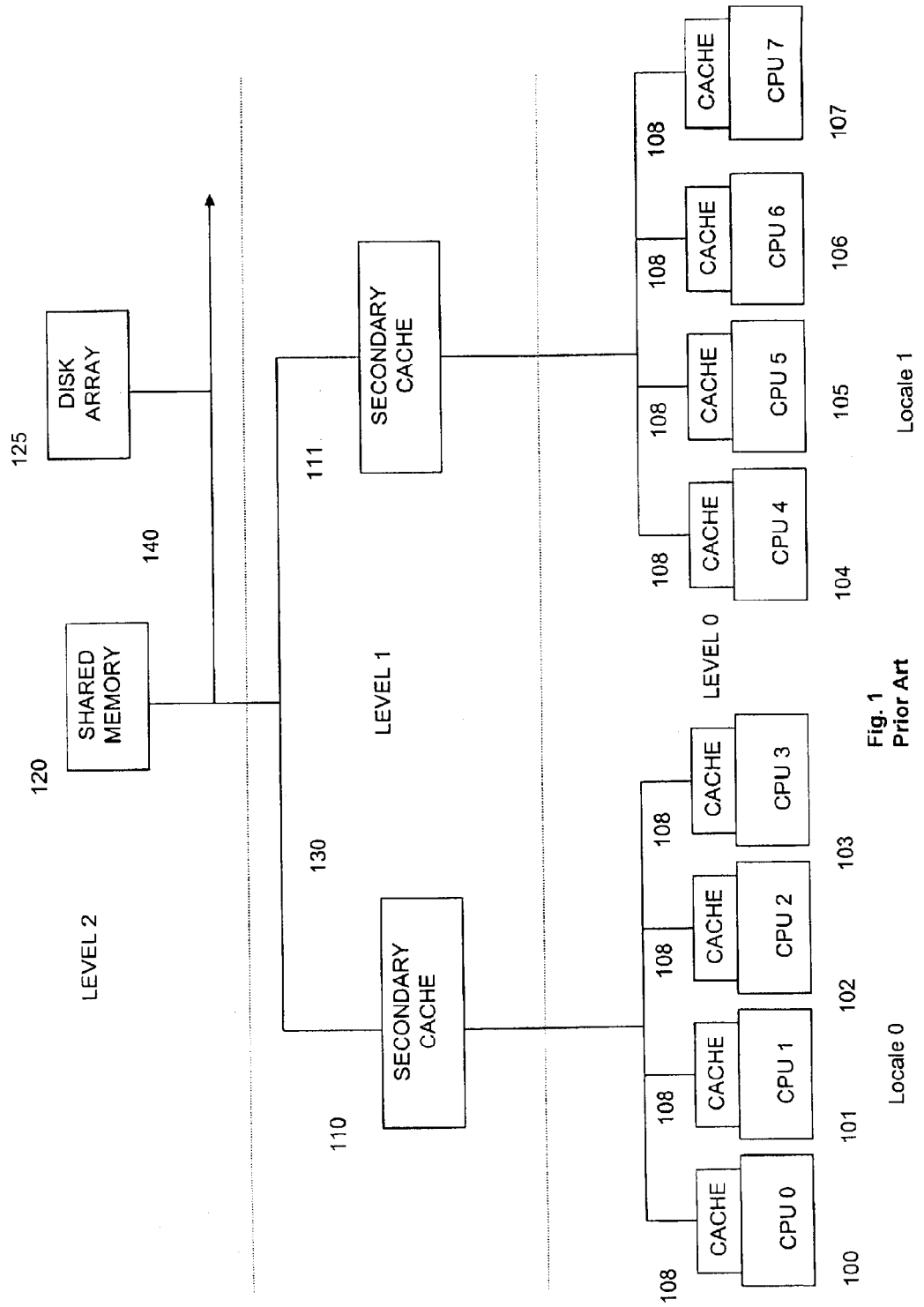
FIG. 1 is an overview of a multi-processor data processing system.

Referring to FIG. 1, an overview of a multi-processing data processing system is depicted. For clarity and case of presentation, an eight-processor system has been depicted, As will be readily appreciated by those of ordinary skill in the art, the invention is applicable to multi-processor systems having other numbers of processors. It is also not necessary that each processor group have four members, or that all processor groups have the same number of processors.

CPUs 100–107 each have individual primary caches 108. Typically, caches 108 will include at least separate data and instruction caches, each being, for example, 8K bytes of random access memory. In addition to the instruction and data cache components of caches 108, an additional cache memory of, for example, 1 megabyte of random access memory may be included as part of caches 108 in a typical system. CPUs 100–103 are connected to secondary cache 110 and make up a NUMA block and locale. CPUs 104–107 are connected to secondary cache 111. Caches 110 and 111 are connected via main system BUS 130 to shared memory 120. I/O BUS 140 connects disc array 125 and other typical data processing elements not shown. In the illustrated eight-processor embodiment, secondary caches 110 and 111 are each 32 megabytes and shared memory 120 is 1 gigabyte of random access memory. Other sizes for each of these memory elements could readily have been employed.

In a system such as described, a "thread group" is a set of closely-related threads within a process that will tend to access and operate on the same data. Handling these related threads as a single globally schedulable group promotes a closer relationship between the threads in the group and individual processors or groups of processors. This improves the ratio of cache hits and overall system performance.

The thread group is the basic unit of global scheduling across the system. The thread group structure maintains the global scheduling policy and global priority which are used to schedule the execution of the thread group. The thread group structure also maintains the cumulative time slice and CPU accounting for all threads in its thread group, so time slicing and CPU accounting records for individual threads within a thread group are not necessary. Each individual thread within the thread group maintains the thread priority and scheduling priority for itself.

Execution of a process often involves a plurality of thread groups, each with a plurality of threads. The use of thread groups in developing a process is well known from the prior art, for example, as described in detail in the previously-referenced U.S. Patent.

Looking again at FIG. 1, the various memory components within system can be conceptualized as comprising three processing levels. Each level can be considered to contain one or more "instances" or nodes in the CPU/cache/shared memory hierarchy, Level 0 contains eight level 0 instances, or in the case of four locales or blocks, sixteen level 0 instances, each instance being one of the CPUs 100–107 and its associated caches 108, Level 1 contains two level 1 instances, each comprising four level 0 instances, and a secondary cache. While eight processors are shown, the system can be arranged with more processors, for example, as a sixteen processor system. In the case of a sixteen processor system, level 1 contains four level 1 instances, each confirming four level 0 instances and a secondary cache. Finally, there is a single level 2 instance containing the two level 1, or as applicable, the four level 1, instances and the shared system memory.

In the system, although the scheduling of threads is now well known, it has to now not been known how to keep all of the processors on a multi-processor system performing productive work. As is well known from the prior art, each processor has a queue of jobs to perform. When the queue for a particular processor is empty, the processor goes idle. There may be times when one or more processors are idle, but the job queue of another processor is not empty. In such a case, it is necessary to decide which idle processor, if any, should receive the work and how long it should wait before taking the job, i.e., poaching the process.

More specifically, a job will take the least amount of time if it is always run on the same processor. This is because of the multiple levels of memory caches used to reduce memory latency. In general, the lower the cache level, the less time it takes to access the memory. When a job is run on a processor, its working set of memory is loaded into the applicable cache 108 of one of processors 100–107. On a NUMA system, there is also another level of cache 110 or 111 that is shared between the four processors 100–103 or 104–107 of a functional block. In the best case scenario, the job is run on the processor which has the required code and data in its cache. The next best case scenario is to run the job on another processor on the same NUMA block. The tradeoff in this circumstance is between waiting for the processor on which the job last ran becoming free, or running the job on another idle processor. If time is allowed for the last processor, the idle processor's cycles will be wasted. If the job is run on a different processor, time and bus bandwidth may be wasted filling the cache of the idle processor and pulling all of the modified memory from the cache of the original processor. As noted previously, although the system and method are being described with reference to two blocks or locales 0 and 1, it will be appreciated that it can be implemented with, for example, sixteen CPUs, namely CPUs 0–3 in a locale 0, CPUs 4–7 in a locale 1, CPUs 8–11 in a locale 2, and CPUs 12–15 in a locale 3.

Turning now to the specific disclosure in the drawing, each processor 100–107 keeps track of the time from when it first went busy. It is intended that a process is poached when the processor on which it is scheduled is too busy to run the process. Accordingly, once a predetermined amount of time has elapsed during which a processor continues to be busy, other processors who have gone idle are then free to poach the process from the busy processor. Each processor 100–107 has a timer for this purpose.

In accordance with the system and method, there is provided a strict ordering in the poaching order. Processors are paired up in a tree and start poaching from its nearest neighbor in the tree, i.e., electrically closest. Thus, in the case of FIG. 1, CPU0 on a first locale 0 (processors 100–103) will first try to poach from CPU1, then from CPU2, and CPU3, then from the locale 1, i.e., CPUs 104–107, and in the case of a sixteen-processor system, a CPU 15 on a locale 3 (not shown) will first try to poach from a CPU 14 (also not shown) and then from CPU 13 and CPU 12. This avoids the randomness that the current systems employ in poaching and tends to order poaching in pairs of electrically closest processors. In accordance with the system and method herein, as noted, each processor has an independent clock that can be synchronized and eliminates wild poaching and provides the quickest response time.

The timing delay variables provided allow a system administrator to control and select a compromise between two extremes. If a delay is set high, it gives the user performance a boost on an idle system since all of the processes are effectively hard affined to their current locales. On the other hand, this means that there is a large system imbalance, and the scheduler will not straighten it out. If the delay is set small, the system load will be quickly balanced among the processors, but the overall throughput may actually degrade due to the cache fill overhead. The appropriate delay is a factor of the working set size of a typical process, the size of the caches, and the memory latency. Thus, the system administrator can then select the appropriate delay variable which maximizes through-put on the system.

Making reference to FIG. 2, the specifics of how poaching occurs is shown therein. More specifically, the process starts at a step 151 when a thread releases a processor and it goes idle. At step 153 the processor checks its level 0 run queue, level 1 run queue and level 2 run queue. At step 155 a determination is made about whether there is a thread group available on any one of these queues. If the answer is yes, then the process proceeds to immediately execute the highest priority thread through connection 157 to step 203 shown in FIG. 2C and discussed hereafter.

If the answer is no, at step 159, the processor increments level 0 idle count, level 1 idle count, marks level 0 and level 1 idle, and reads the current time. The idle indications are examined later by other idle processors looking for work. At step 161, every other run queue is sequentially checked and at step 163 a determination is made if this locale is marked to be skipped. The locale is marked to be skipped if there are any idle processors on it. In that case, it is always better to allow the idle processor from that same locale to pick up any work there.

If the locale is marked to be skipped, then at step 165 the next run queue is selected. If the answer is no, then at step 169 a determination is made about whether the run queue next due time is less than the current time. If the answer is no, the process returns to step 165 as previously described, and if the answer is yes, at 171 connects to 171 in FIG. 2B. At step 173 the run queue next due time is recomputed and set equal to the time the run queue went busy plus the relative time out. Note that this value is stored local to the processor doing the calculation so that it can be quickly checked later without incurring any bus traffic.

At step 175 a determination is made about whether the run queue next due time is less than the current time. If the answer is no, a connection is made at 177 to the process as further illustrated in FIG. 2D. If the answer is yes, at step 179 a determination is made about whether there is work to do on a run queue. If the answer is no, the process is passed at 183 through the steps illustrated in FIG. 2E. If the answer is yes, at step 185 the highest priority thread in the run queue is selected, and the process continues at 187 as connected to FIG. 2C, where at step 189 the process decrements level 0 "is idle" count, and sets level 0 went busy time to the current time.

At step 191, decrement level 1 is idle count, and at step 193 a determination is made about whether the level 1 idle count is equal to zero. If not equal to zero, the process is passed to step 197 discussed hereafter. If equal to zero, the process is passed to step 195 in which level 1 went busy time is set to the current time, and at step 197 decrement level 2 "is idle" count.

At step 199 a determination is made if level 2 idle count is equal to zero. If not equal to zero, the process is passed to step 203 discussed hereafter. If equal to zero, at step 201, level 2 went busy time is set to the current time, and at step 203, the highest priority thread on a selected run queue is executed.

Figure 2A:
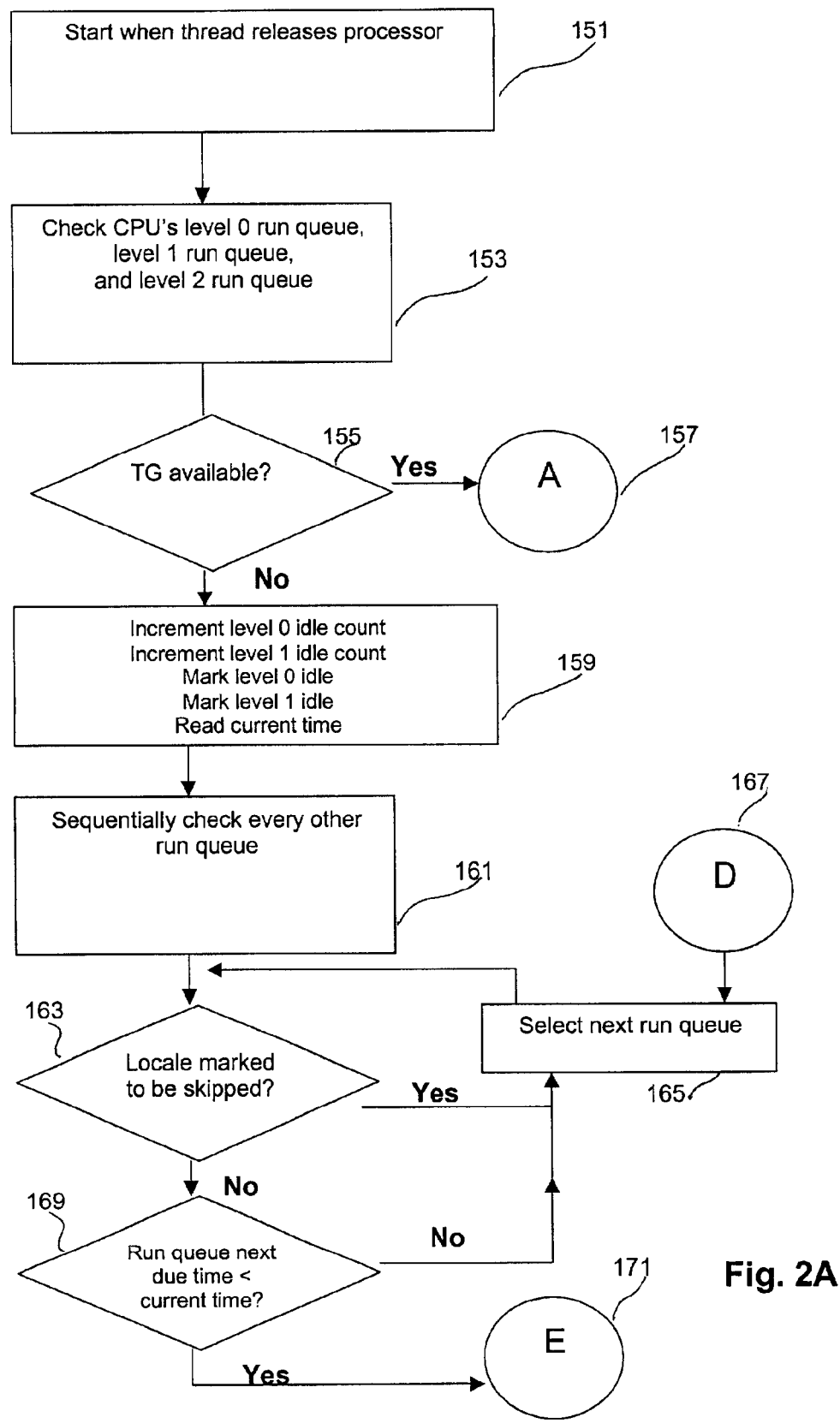
FIG. 2A–2E shows the flow of how a process is stolen or poached by an idle processor when the processor on which it is scheduled on the queue is too busy to run the process.
Figure 2B:
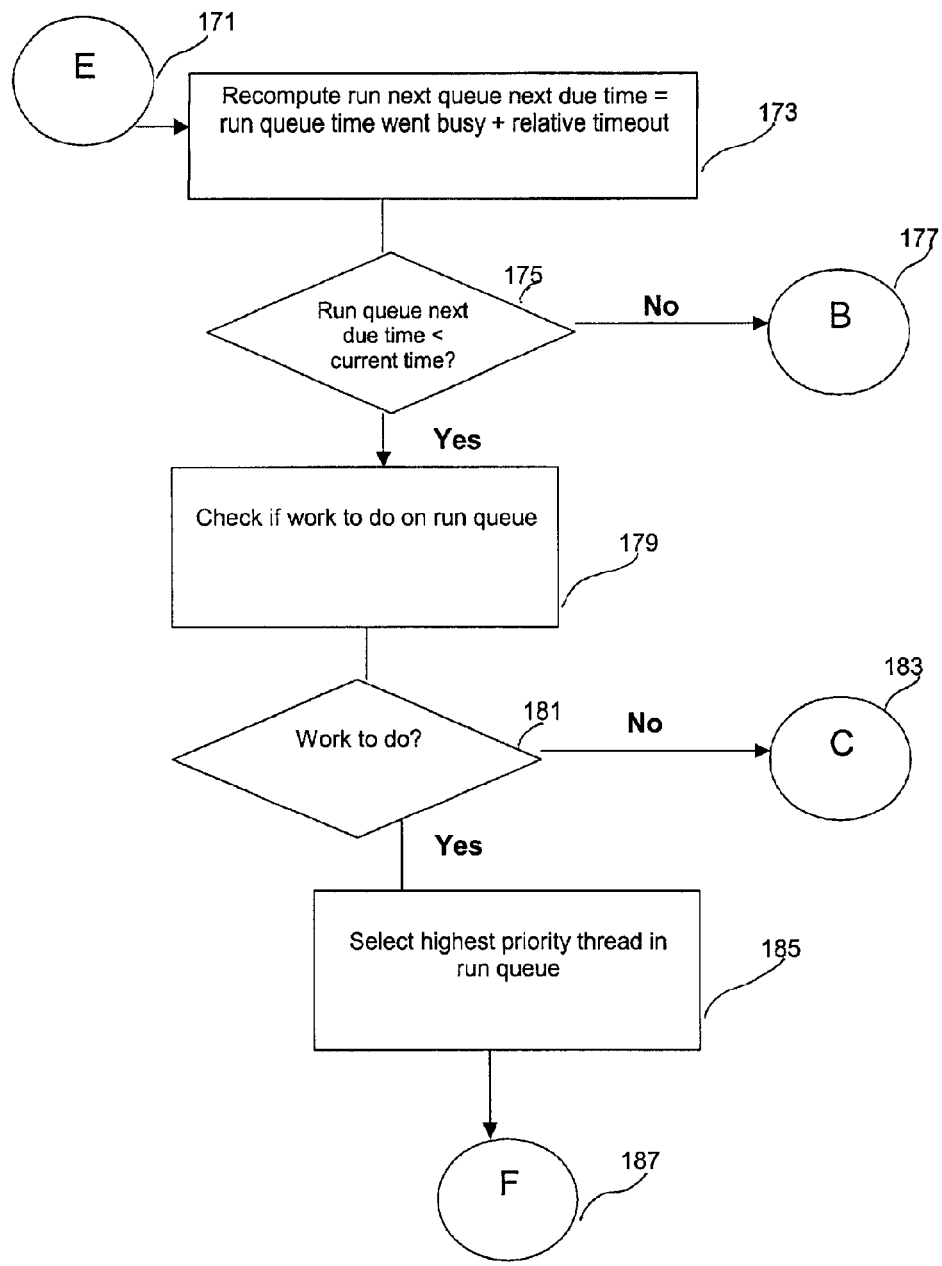
Figure 2C:
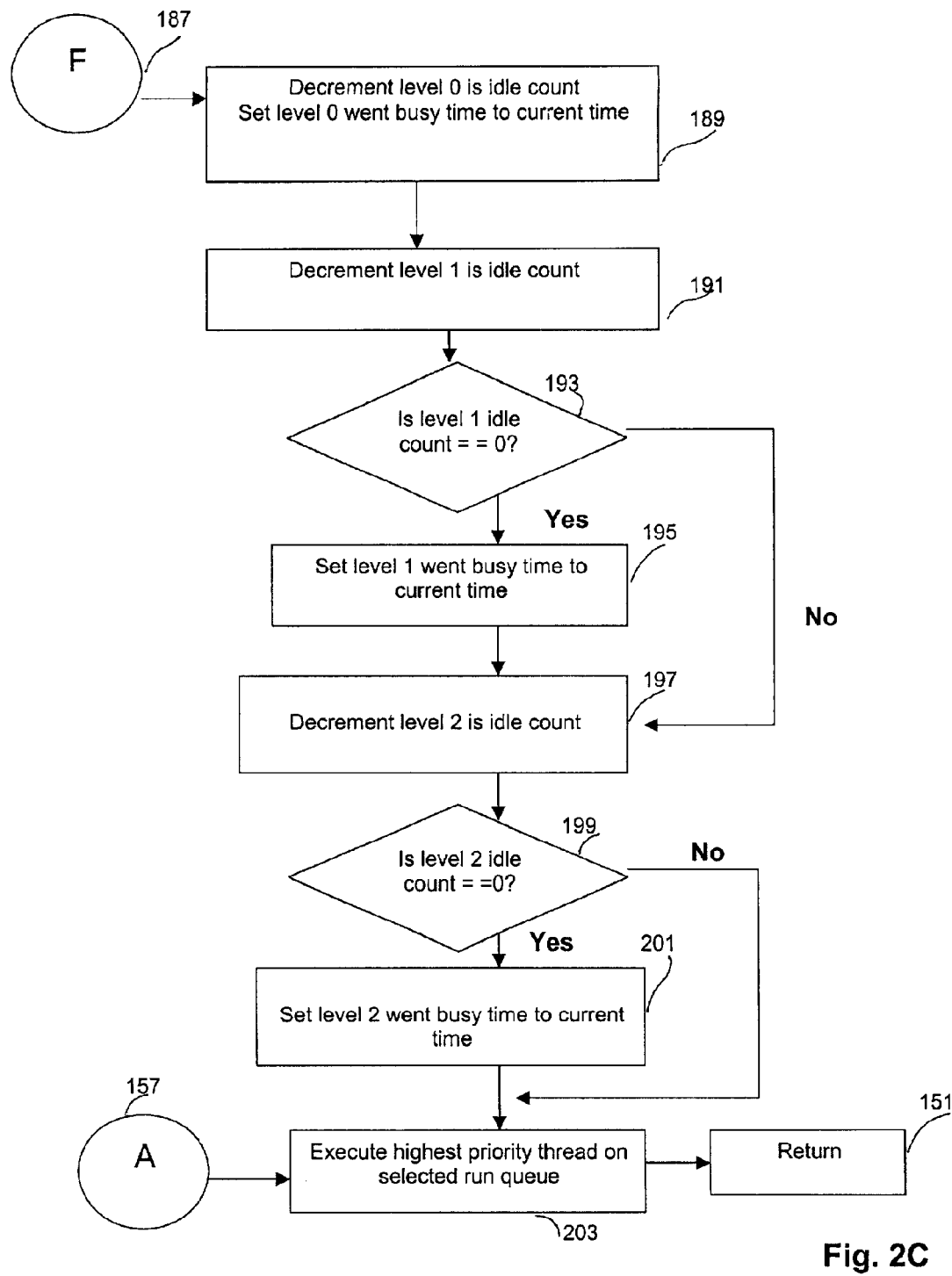

As may be appreciated from the previous discussion with reference to FIG. 2A, in addition to the above-discussed process, if at step 155 a determination is made that a thread group is available, the process passes directly to step 203 shown in FIG. 2C for execution of the highest priority thread, and after the highest priority thread is executed, then the process returns to the start at step 151.

Figure 2D:
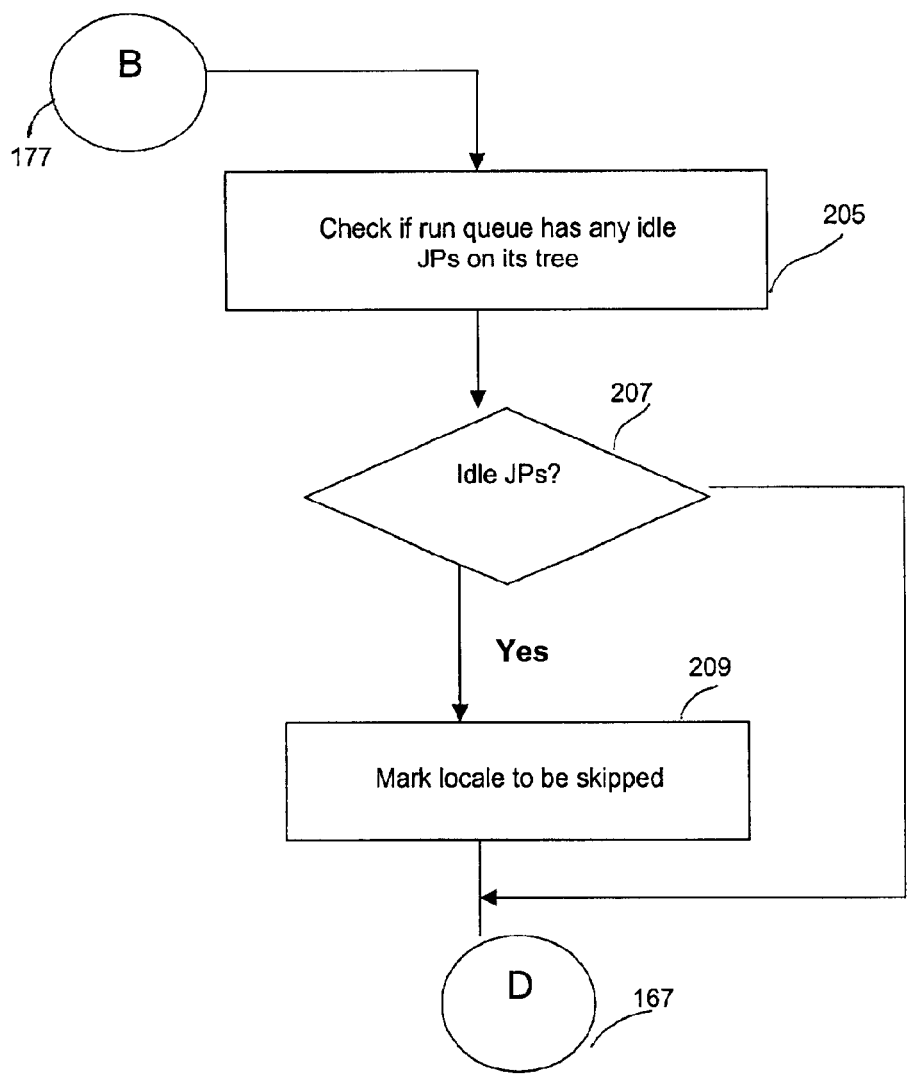

Referring now to FIG. 2D, if at step 175 shown in FIG. 2B it is determined that the run queue next due time is not less than the current time, the process passes to step 205 where it checks if the run queue has any idle processors on its tree. If at step 207 it is determined that there are idle processors, then the locale is marked to be skipped. If there are no idle processors, the process passes to 167 and return to step 165 previously discussed and shown in FIG. 2A.

Figure 2E:
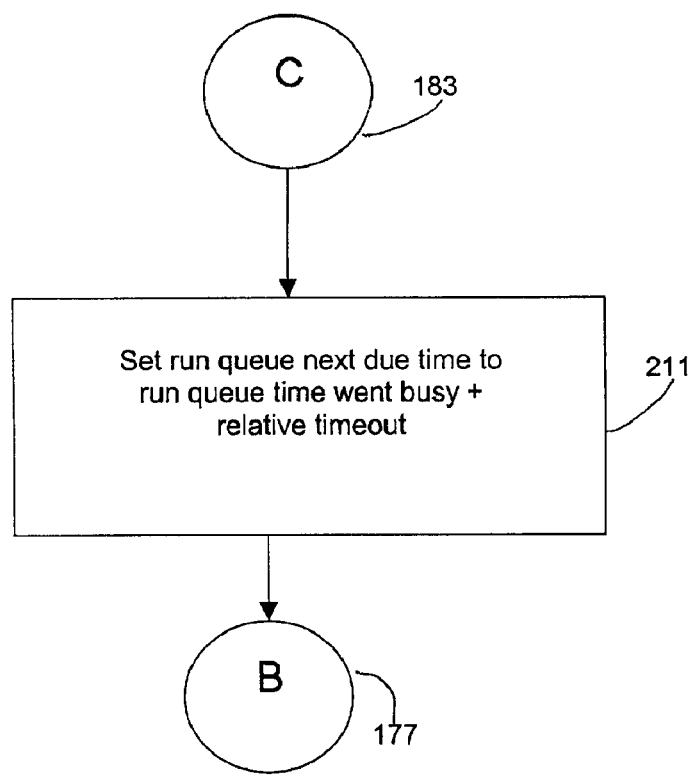

Referring again to FIG. 2B, if at step 181 it is determined that there is no work to be done, the process passes to step 211 in FIG. 2E where the run queue next due time is set to equal the run queue time when the processor went busy plus the relative time out, and then returns to step 205 in FIG. 2D.

Figure 3:
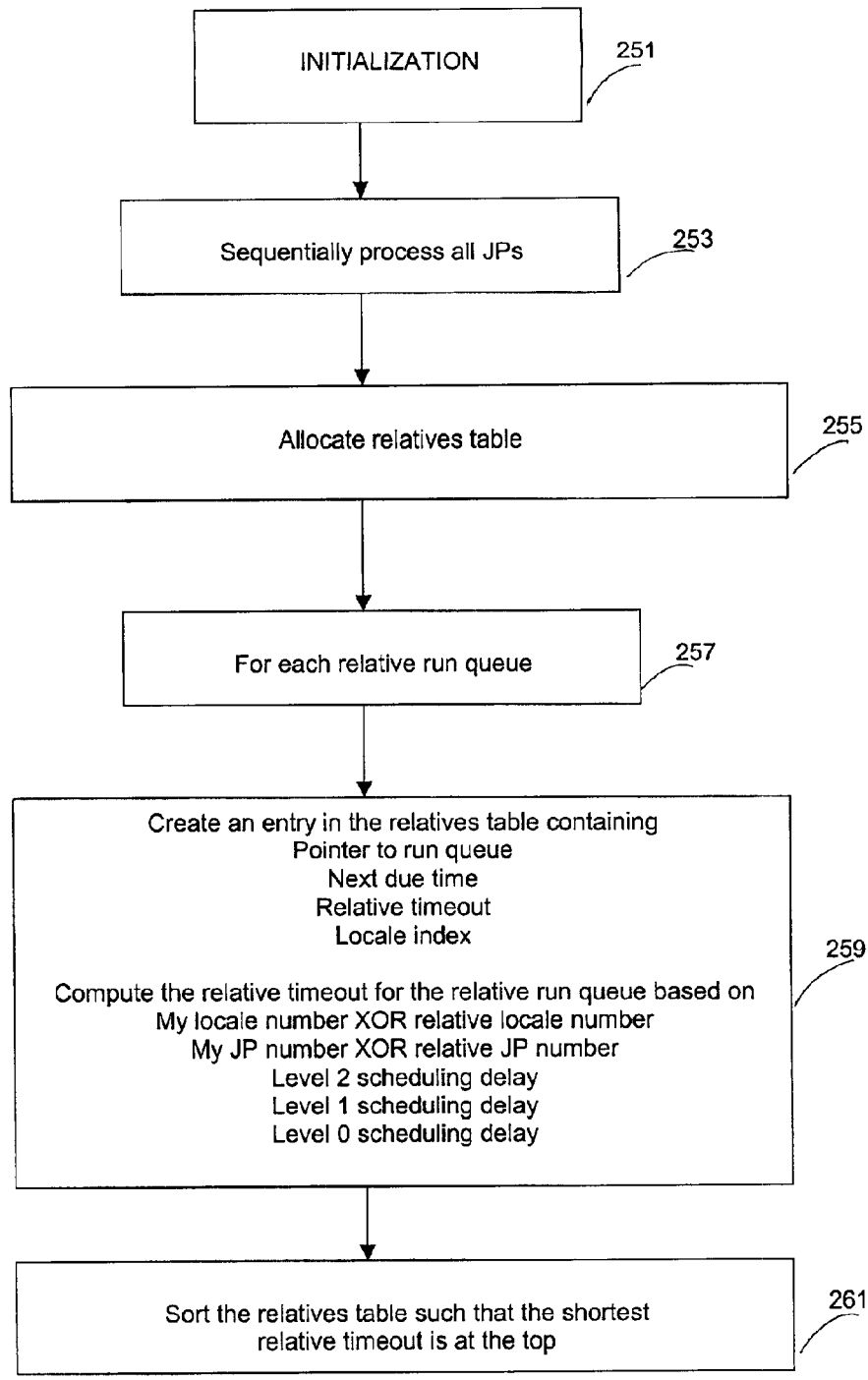
FIG. 3 shows the flow of how the job processes and relatives table is allocated such that the shortest relative time out for a job process is arranged at the top of the table, and showing how time periods are set in accordance with differences in distances between processors.

FIG. 3 shows the process as the system is initialized and how the time periods are set.

At step 253 all processors are sequentially processed. Thereafter at step 255 the relatives tables are allocated. At step 257 each relative run queue is processed in a manner such that at step 259 an entry is created in the relatives table containing a pointer to run queue, next due time, relative time out and locale index. The relative time out for the relative run queue is computed based on the locale number XOR relative locale number, the processor number XOR relative processor number, level 2 scheduling delay, level 1 scheduling delay, and level 0 scheduling delay. At step 261, the relatives table is sorted such that the shortest relative time out is at the top.

It will be appreciated from the above description that the invention may be implemented in other specific forms without departing from the spirit or essential characteristics thereof. The scope of the invention is indicated by the appended Claims rather than by the foregoing description and all changes within the meaning and range of equivalency of the claims are intended to be embraced therein.

What is claimed is:

1. A method of allocating resources in a plurality of processors system, each processor of said plurality having a cache associated therewith, comprising:
   when at least one processor of said plurality of processors system is idle, detecting at least one other processor of said plurality of processors which is not idle;
   timing a predetermined period of time during which said at least one other processor which is not idle remains not idle; and
   if said at least one other processor which is not idle remains not idle when the predetermined period of time has elapsed, then poaching a process on a queue of said at least one non-idle processor to be run by said at least one processor which is idle, wherein if more than one processor is idle, poaching the process with the idle processor which is electrically closest to the at least one non-idle processor, wherein the time period during which a non-idle processor is allowed to remain non-idle is greater the farther away a non-idle processor is electrically located relative to an idle processor, and wherein if the processor electrically closest to the idle processor is idle, and if the processor electrically closest to it is idle, it will then try to poach from the next processor which is electrically closest to it until it encounters a non-idle processor on which poaching can occur.

2. The method of claim 1 wherein it is conducted on a ccNUMA system.

3. The method of claim 1 wherein each processor starts a timer associated therewith when it goes non-idle, and allowing an idle processor to poach a process therefrom only when a predetermined amount of time has elapsed on the timer.

4. The method of claim 1 wherein said processor system is a four block system comprised of sixteen processors arranged as $CPU_0$, $CPU_1$, $CPU_2$, $CPU_3$ on a locale 0, $CPU_4$, $CPU_5$, $CPU_6$, $CPU_7$ on a locale 1, $CPU_8$, $CPU_9$, $CPU_{10}$, $CPU_{11}$ on a locale 2, and $CPU_{12}$, $CPU_{13}$, $CPU_{14}$, $CPU_{15}$ on a locale 3, and further comprising having each idle processor attempt to poach first from its nearest non-idle processor in its locale, and if there are no non-idle processors in said locale, from a processor in the closest locale having non-idle processors.

5. The method of claim 4 wherein in the event more than one idle processors attempt to poach a process from a non-idle processor, allowing the idle processor in, closest electrical proximity to the non-idle processor poach the process.

6. The system of claim 1 wherein the plurality of processors are arranged in four blocks comprised of sixteen processors arranged as $CPU_0$, $CPU_1$, $CPU_2$ and $CPU_3$ on a locale 0, $CPU_4$, $CPU_5$, $CPU_6$ and $CPU_7$ on a locale 1, $CPU_8$, $CPU_9$, $CPU_{10}$ and $CPU_{11}$ on a locale 2, and $CPU_{12}$, $CPU_{13}$, $CPU_{14}$ and $CPU_{15}$ on a locale 3, and comprising said processors configured such that each idle processor attempts to poach first from its nearest non-idle processor in its locale, and if there are no non-idle processors in said locale, from a processor in the closest locale having non-idle processors.

7. The system of claim 6 wherein said processors are configured for allowing an idle processor in closest electrical connection to a non-idle processor to poach a process therefrom in the event more than one idle processor attempts to poach a process from said non-idle processor.

8. A data processing system for allocating resources for simultaneously executing a plurality of processing tasks, comprising:
   a plurality of processors, each having a cache associated therewith;
   a timer associated with each processor for timing from the beginning of receiving a process from the processor's queue, the duration of time the process is run, during which time the processor is running the process is non-idle;
   means for detecting at least one other processor of said plurality of processors which is not idle, and for determining the duration of time any one of said at least one other processor is not idle;
   means for then poaching a process from a non-idle processor by an idle processor when said duration of time during which the non-idle processor is running a process exceeds a predetermined amount; and
   means for allowing an idle processor connected electrically closest connected to a non-idle processor to poach a process in the event there are more than one non-idle processors, further configured to allow the time period during which a processor is allowed to remain non-idle to be determined in accordance with proximity in electrical connection between the idle processor and a non-idle processor, wherein the greater the connection distance, the greater the predetermined amount of time, and further configured for having an idle processor first try to poach from a non-idle processor electrically closest to it, and if the processor electrically closest to it is idle, then to try to poach from the next electrically closest processor until it encounters a non-idle processor on which poaching can occur.

9. The system of claim 8 wherein said system is a ccNUMA system.

10. The system of claim 8 wherein each processor is configured for starting the timer associated therein when it goes non-idle.

11. The system of claim 10 wherein each processor is configured for setting the predetermined amount of time in relation to electrical connection proximity between an idle processor and a non-idle processor.

12. The system of claim 11 wherein each processor is configured for setting the predetermined amount of time such that the greater the electrical connection distance between an idle and a non-idle processor, the greater the amount of time which is allowed to elapse before an idle processor is allowed to poach a process from a non-idle processor.

13. A method of allocating resources in a plurality of processors system, each processor of said plurality having a cache associated therewith, comprising:

when at least one processor of said plurality of processors of said system is idle, detecting at least one other processor of said plurality of processors which is not idle;

starting a timer at said at least one other processor when it goes not idle, and timing a predetermined period of time during which said at least one other processor which is not idle remains not idle;

if said at least one other processor which is not idle remains not idle when the predetermined period of time has elapsed on the timer, then poaching a process therefrom with an idle processor; and conducting said poaching in a manner wherein an idle processor first tries to poach from a non-idle processor electrically closest to it, and if the processor electrically closest to the idle processor is idle, trying to poach from the next processor which is electrically closest to it until it encounters a non-idle processor on which poaching can occur, and wherein the predetermined time period during which a non-idle processor is allowed to remain non-idle is greater the farther electronically away a non-idle processor is located relative to an idle processor.

* * * * *